United States Patent [19]

Faulhaber

[11] Patent Number: 4,905,085
[45] Date of Patent: Feb. 27, 1990

[54] SYNCHRONOUS SAMPLING SYSTEM

[75] Inventor: Mark E. Faulhaber, Wilmington, Del.

[73] Assignee: E. I. Du Pont de Nemours and Company, Wilmington, Del.

[21] Appl. No.: 251,961

[22] Filed: Sep. 29, 1988

[51] Int. Cl.$^4$ .............................................. H04N 5/04
[52] U.S. Cl. ..................................... 358/148; 358/158; 331/20
[58] Field of Search ............... 358/148, 149, 150, 152, 358/153, 154, 158, 320, 337, 339; 331/1 A, 20

[56] References Cited

U.S. PATENT DOCUMENTS

| | | | |
|---|---|---|---|
| 3,259,851 | 7/1966 | Brauer | 331/14 |
| 3,287,655 | 11/1966 | Venn et al. | 331/14 |
| 3,971,063 | 7/1976 | Michael et al. | 358/8 |
| 3,978,519 | 8/1976 | Stalley et al. | 358/8 |
| 4,065,787 | 12/1977 | Owen et al. | 358/8 |
| 4,074,307 | 2/1978 | Dischert et al. | 358/337 |
| 4,105,946 | 8/1978 | Ikeda | 331/1 |
| 4,253,116 | 2/1981 | Rodgers, III | 358/149 |
| 4,504,862 | 3/1985 | Achtstaetter | 358/158 |
| 4,520,394 | 5/1985 | Kaneko | 358/150 |
| 4,528,521 | 7/1985 | Grimes | 331/1 |
| 4,613,827 | 9/1986 | Takamori et al. | 331/20 |
| 4,654,604 | 3/1987 | Smith et al. | 331/1 |
| 4,736,162 | 4/1988 | Ishihara | 328/139 |

OTHER PUBLICATIONS

Burst-Locked Oscillator Avoids Side Lock—Dischert—NASA Tech Briefs, 5/88.

Primary Examiner—John W. Shepperd
Assistant Examiner—Michael D. Parker

[57] ABSTRACT

The pixel clock of a system for receiving, sampling, and digitally storing the information contained in an analog sampled-data video signal is automatically synchronized and stabilized so that the received data is sampled by said system at or near the center of each successive received pixel period. A preset counter is employed to determine whether the receiving system clock is running at a predetermined number of pixel periods per horizontal sweep; any variation from the predetermined number is sensed and converted to a DC voltage level which is used to adjust the receiving system clock automatically to the correct number of periods per sweep. Synchronization of the receiving system clock is accomplished by triggering it with the sync pulse portions of the received video signal.

8 Claims, 4 Drawing Sheets

SYNCHRONOUS SAMPLING SYSTEM

BACKGROUND OF THE INVENTION

1. Field of the Invention

This invention relates to digital sampling of analog communications signals, and more particularly to receiver-based sampling error elimination in video transmission systems having a specified number of intensity level time intervals per horizontal sweep.

2. Description of the Prior Art

In the continuing search for more reliable video transmission systems, several different approaches have been tried. One useful approach has been to make use of a process of sampling and quantizing, which comprises converting continuous signals of time and amplitude into discrete quantized "stairsteps" uniformly sequenced in time. As described in U.S. Pat. No. 2,681,385, issued to B. M. Oliver on June 15, 1954, sampling alone does not necessarily entail loss of significant information as long as the sampling frequency is at least twice as great as the highest frequency of interest in the information signal. Furthermore, quantization does not cause a serious loss of information if the number of quantizing levels is sufficiently high.

The quantized signal thus obtained may be, if desired, stored in the form of individual digital bytes in a digital memory. Information thus stored may be conveniently retrieved from the digital memory whenever needed. Such a system typically employs eight bit digital data bytes for storage, thus allowing for $2^8 = 256$ quantizing levels (which number is more than adequate for most applications).

Oftentimes it is necessary or desirable to transmit such stored video data along an analog transmission channel (e.g. a coaxial cable or a radio link). In any case, eventually the digital data will need to be reconverted to an analog video signal in order to display it on an analog display device. To do so, the digital memory is interrogated sequentially and the data is processed through a digital-to-analog (D/A) converter to recreate an analog stairstep video signal.

Reception of such a signal is straightforward and well known, but properly sapling it for later quantized data storage in a digital format can be quite difficult. The main problem with such sampling lies in avoiding sampling during the transition times between sample levels, i.e. during the almost vertical portions of the stairstep waveform; sampling therein results in faulty data being stored and a corresponding serious degradation of a visual image produced therefrom. In particular, direct sampling of such a waveform at a fixed rate often results in the well-known "aliasing" phenomenon which evidences itself as "beat patterns" (i.e., alternate light and dark regions) in the visual image produced. Sampling at any rate not an exact integer multiple or subharmonic of the transmitted rate will result in a variation in the number of samples per pixel, creating a spatial distortion of the data in the receiver's memory.

One traditional approach to eliminate such beat patterns involves passing the received stairstep analog signal through a low-pass filter prior to sampling the signal in order to broaden the transition times between successive sample levels. Such an approach, used judiciously, does serve to reduce substantially the observable beat patterns; unfortunately, that approach also invariably removes frequency components of the signal near the pixel rate which reduces the overall sharpness or "definition" of the visual image produced. This is somewhat analogous to adjusting the treble control on a car radio to eliminate high frequency static -- the static goes, but so do the cymbals!

It is therefore desirable to avoid the above-described prefiltering step if possible. Another approach to the problem is to oversample the received signal. This works reasonably well, but it requires significantly expanded storage space for the data thus collected. In order to eliminate aliasing without prefiltering, and without oversampling, it is necessary to keep the receiving sampling system in step with the transmitter.

Several approaches have been employed in the prior art, each with the express goal of sampling a video signal accurately, to wit:

(1) U.S. Pat. No. 3,971,063, issued to P. C. Michael, et al. on July 20, 1976, describes a system for compensating for potential variations in timing between horizontal synch pulses of a received video signal which might occur due to undesired perturbations (e.g. wow and flutter) in the tape transport speed of a transmitting video tape recorder. Therein an error signal is generated by comparing the time to produce the receiver's normal number of sampling clock pulses per line with the actual time period between each of the transmitted horizontal sync pulses. The error signal thus generated is employed to vary the period of the normal number of sampling clock pulses in sympathy with the fluctuating off-tape transmitted line periods between horizontal sync pulses to maintain a constant difference between them. No fixed number of transmitter pixel clock pulses per horizontal sweep is used, and no synchronized pixel-by-pixel sampling is accomplished thereby.

(2) U.S. Pat. No. 4,105,946, issued to Y. Ikeda on Aug. 8, 1978, discloses a phase-locked-loop frequency synthesizer that employs a digital counter to determine whether or not a slave oscillator is operating at a desired harmonic frequency with respect to the frequency of a reference oscillator. An error signal corresponding to the magnitude of a differential count is generated and used as the control voltage for the phase locked loop. Direct access is made therein to the source reference oscillator, and no synchronization is needed or attempted.

(3) U.S. Pat. No. 4,613,827, issued to T. Takamori, et al. on Sep. 23, 1986, teaches a phase locked loop approach to generating a frequency that varies as a function of the time difference between the horizontal sync pulses of an input video signal from a video tape recorder, said frequency being held in locked phase with the color burst signal and horizontal sync signal portions of said input video signal. The purpose of the system therein described is to remove jitter from a tape-recorder-produced video signal. The system of Takamori does not employ a bang-bang anti-aliasing feedback system comparable to that of the instant invention.

(4) The article entitled *Burst-Locked Oscillator Avoids Side Lock*, which appeared in *NASA Tech Briefs*, May, 1988, page 20, protrays a digital error-detection-and-correction scheme for a color-television oscillator circuit that stabilizes the receiver color burst frequency. The system employs a read-only-memory (ROM) controller that provides a high or low oscillator frequency correction control signal in response to the output of a counter. The counter counts the number of cycles of a voltage controlled oscillator that occur in each picture line (i.e., the horizontal data portion of the received video signal). This system allows the oscillator to vary as much as one full oscillator cycle per picture line while still being deemed to be the correct number of cycles per line. As such the oscillator would not be suitable for use with a synchronized pixel-by-pixel data sampler in accordance with Applicant's novel approach hereinafter disclosed and claimed.

None of the approaches described above makes full use of a significant fact that is known a priori for most stairstep video signal transmitting and receiving systems, i.e., the number of stairstep periods (also known as pixel clock periods) per each horizontal sweep data portion of the video signal is a known integer constant. It is therefore an object of the instant invention to provide an improved method and apparatus for sampling a received stairstep video signal very accurately and efficiently by requiring that the number of receiver and sampler pixel clock periods per each horizontal sweep data portion of the received video signal is maintained within a range of values that is very close to a predetermined constant.

SUMMARY OF THE INVENTION

The invention is directed to a synchronous sampling system located at the receiving end of an analog sampled data information channel. A voltage-controllable sampling system pixel clock oscillator is forced by an automatic control system to have a predetermined number of pixel clock periods, with an accuracy that is within a small fraction of a clock period, between each horizontal sweep sync pulse contained in a received composite analog sampled-data stairstep video signal. The sampling system pixel clock oscillator is started at the trailing edge of each horizontal sync pulse and stopped at the leading edge of each ensuing horizontal sync pulse. The number of sampling system pixel clock periods between sequential horizontal sync pulses is counted and compared to a preset count. A difference therebetween is converted to a DC control voltage that automatically adjusts the sampling system pixel clock oscillator to conform closely to the sending system's predetermined number of pixel clock periods per horizontal data sweep. The analog to digital converter and the digital memory of the sampling system are thus synchronized to sample and store the received analog stairstep signal data well within the flat region of each stairstep.

In a preferred embodiment of the invention the horizontal sync pulses are detected by a standard sync stripper which triggers the sampling system's pixel clock oscillator as well as the system controller. The system controller resets the preset counter for each desired measurement and converts the preset counter's borrow output to a DC control voltage suitable for adjusting the sampling system's pixel clock oscillator to cause the oscillator to produce very nearly the preset number of pixel clock periods between horizontal sync pulses. The control system employed in the invention comprises a modified "bang-bang" system including an analog error signal integrator that is capable of homing the receiver sampler into a desired range with excellent accuracy. As such the invention is the simplest, most efficient, least expensive technique known to Applicant for accomplishing apparently flawless sampling of a received composite analog sampled-data stairstep video signal.

BRIEF DESCRIPTION OF THE DRAWING

The reader's understanding of a practical implementation of a preferred embodiment of the invention will be enhanced by reference to the following detailed description taken in conjunction with the drawing figures, wherein.

DETAILED DESCRIPTION OF A PREFERRED EMBODIMENT

Consider a digital video data reception and storage system designed to receive a transmitted video signal containing 900 pixels (data points) per lines and 900 lines per image field. On a symmetrical display device the system produces a square outlined image, each pixel of which comprises a small square dot having 256 different possible shades of grey from near black to near white. The horizontal retrace period for this display system consists of 40 continuous pixel clock periods. During the entire retrace period the video signal contains a negative-going horizontal sync pulse. With this system, the received video signal resembles that shown in FIG. 1 (not to scale), wherein each "stairstep" analog video data line signal contains 900 separate voltage levels in 900 equally-spaced pixel clock time periods (i.e. $\Delta t$'s, wherein $\Delta t = t_n - t_{n-1}$) that are applied progressing uniformly in time and space, from left to right across the display device (e.g. a cathode ray tube [CRT] screen).

Figure 2:
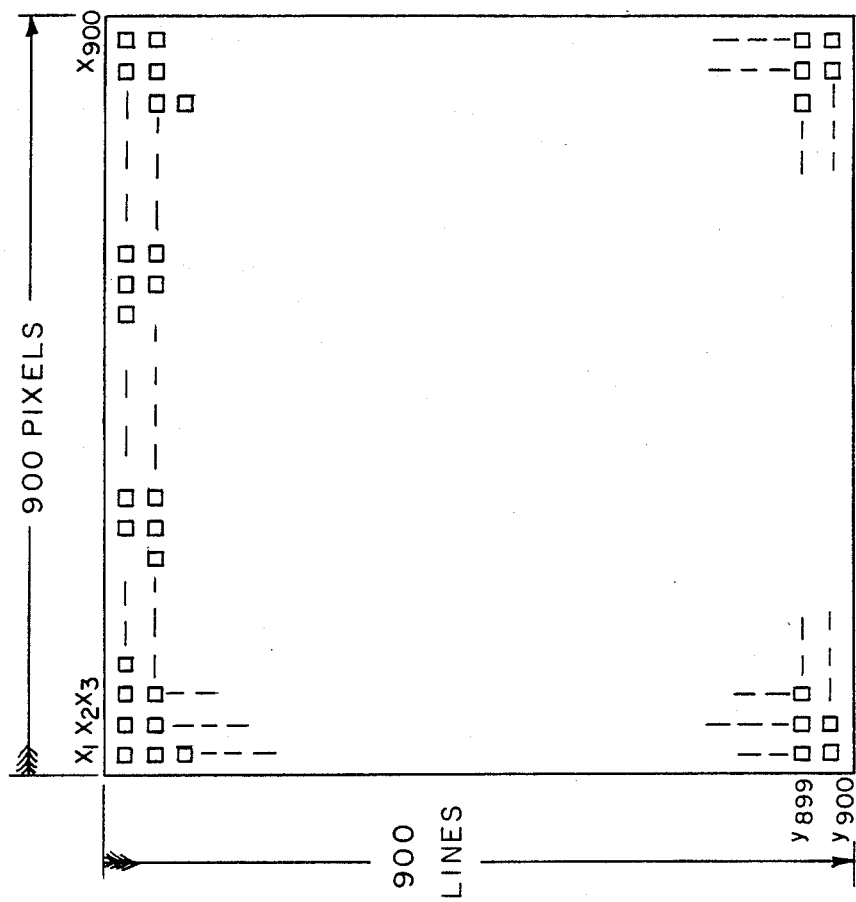
FIG. 2 shows a symmetrical visual display format that employs sequential pixels in accordance with the invention.

After the last line in each 900 by 900 pixel field (i.e. the 900th horizontal sweep) there is a vertical sync signal that cause the system to restart a new frame at pixel number 1 of line number 1. In other words, after illuminating pixel $X_{900}$ $Y_{900}$ (as depicted FIG. 2), the system restarts at pixel $X_1$, $Y_1$, and proceeds to reilluminate the entire display device sequentially one pixel at a time. This entire process is repeated rapidly in order to produce a visual image on the display device that has little or no flicker when viewed by the human eye.

Receiving and displaying video data as described above is well known to video system engineers. The difficulty occurs not so much in displaying the received video image as it does in capturing and storing the image data in digital form so that an entirely faithful and stable reproduction of the originally received stairstep analog video image data content may be obtained upon demand by simply interrogating a digital memory (i.e. a digital data storage device).

The key to accomplishing proper storage of the received video image data is to sample the received video signal at or near the middle of each "stairstep" voltage level contained therein. So, for example, referring to FIG. 1, the preferred time to sample the stairstep voltage level occurring between $t_1$ and $t_2$ is at $t = (t_1 + t_2)/2$ (in other words, at the middle of $\Delta t$). The same rule applies to each succeeding voltage level at each respective transmitting pixel clock time interval.

Figure 1:
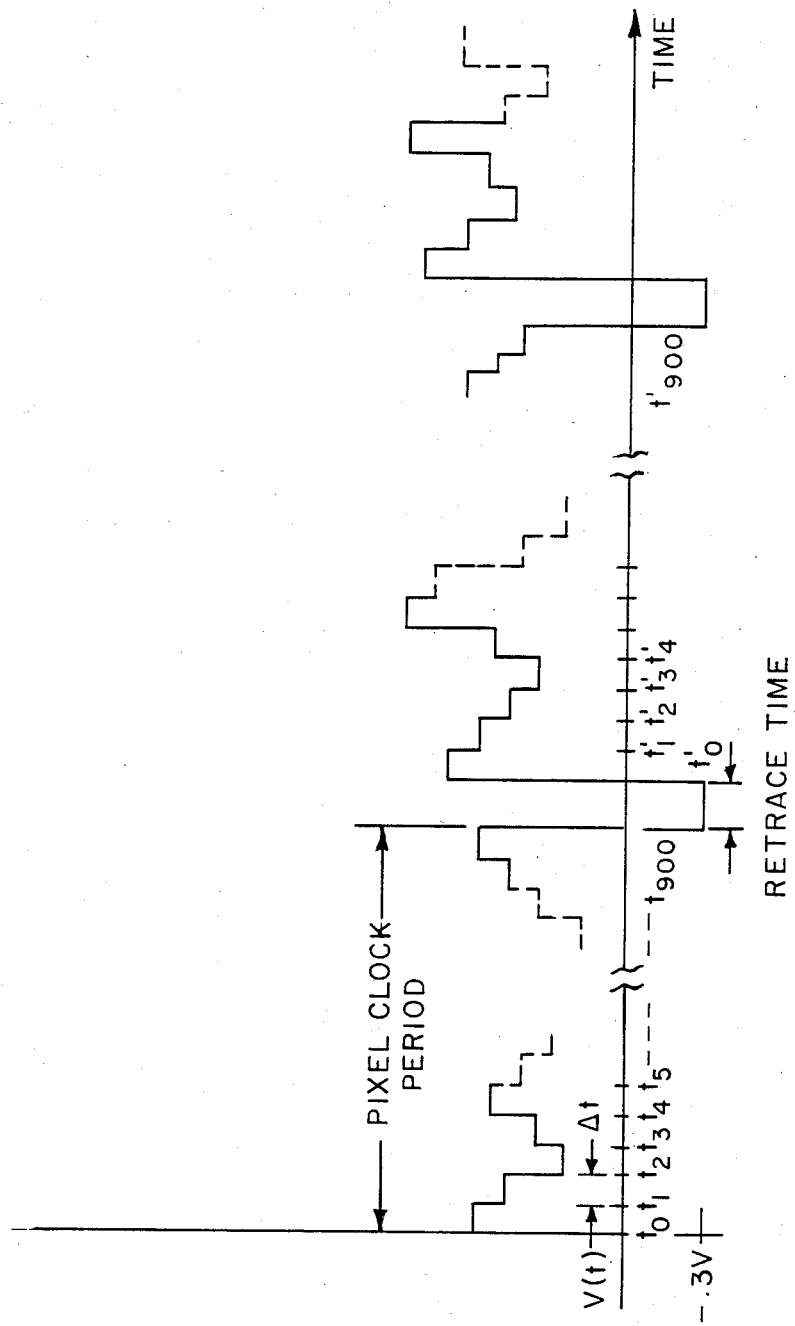
FIG. 1 depicts a typical analog sampled-data stairstep video signal which Applicant's invention is capable of receiving and synchronously sampling.

What must be avoided is allowing any sampling of the received video signal to occur during the small transition time between the stairsteps, that is at or very near $t_1$, $t_2$, $t_3$, etc. as depicted in FIG. 1. Such improper sampling would produce unreliable data since the voltage sampled would not be at either of two successive stairstep voltage levels, but rather, at some undetermined and incorrect level therebetween.

The instant invention makes use of the fact that the number of pixel clock periods per transmitted horizontal video data line is known to be precisely 900 sequential periods equally spaced in time. Thus the pixel clock of the receiving and storing system is coerced to also have almost exactly 900 periods between the end of a received horizontal sync pulse and the start of the immediately subsequent received horizontal sync pulse.

Figure 3:
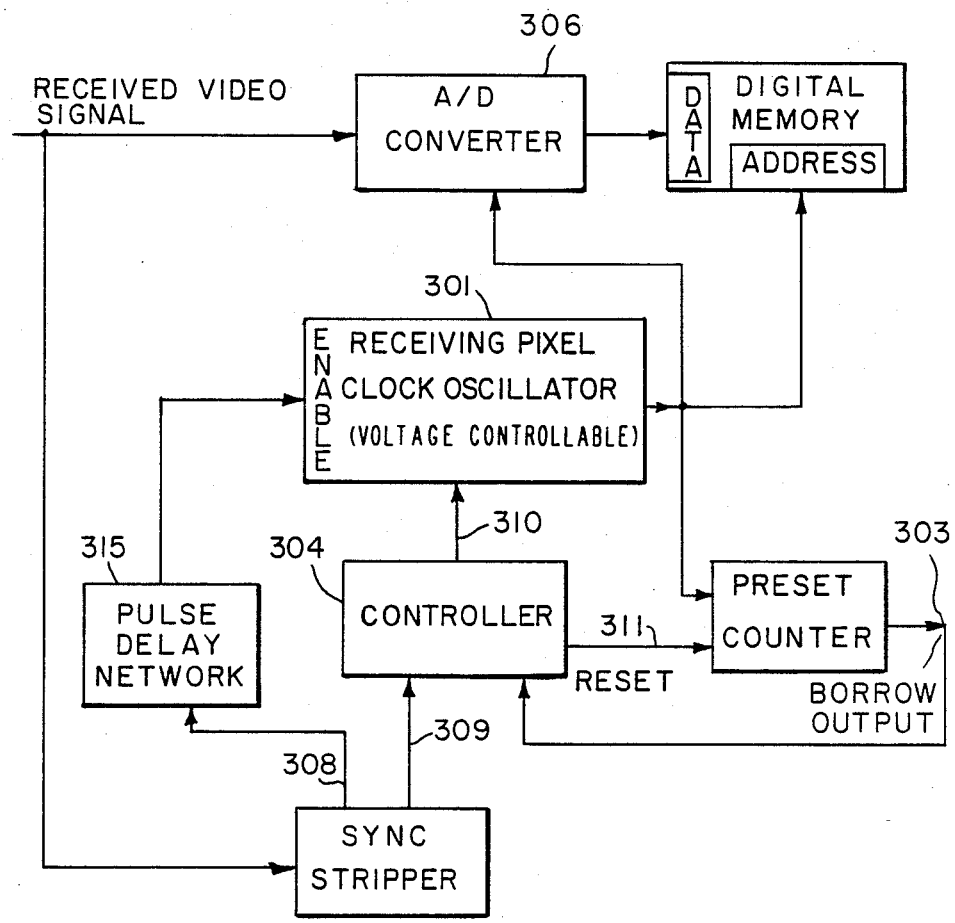
FIG. 3 shows a block diagram of a preferred embodiment of the invention.

This is done as shown in FIG. 3 by counting the number of pixel clock pulses produced by the receiving and storing system pixel clock oscillator 301 during the received video data period (i.e. [$t_{900} - t_0$] in FIG. 1) with preset counter 302. If the count is more or less than 900 per line, the borrow output 303 of the counter will so indicate (i.e. it will remain at 0 volts if the count is less than 900 per line and rise to +5 volts if the count is greater than 900 per line). This signal is then fed into the controller 304 which produces a small correcting change in its DC voltage output level that is fed concurrently via line 310 directly into the control input of the receiving and storing system pixel clock oscillator 301. This oscillator is a simple pulse generator that is DC voltage controllable over a range of 2 MHz to 40 MHz corresponding to a DC input range of 0V to 3V. The design of such oscillators is well known to those of ordinary skill in the electronics arts.

Sync stripper 305 includes a standard device for detecting the sync signals from a composite video signal. The one used by Applicant is the National Semiconductor Co. Model No. LM 1881.

The output of sync stripper 305 on horizontal sync output line 308 is used to enable the receiving and storing pixel clock oscillator 301 only during each received video line. One preferred embodiment of the invention includes a simple adjustable pulse delay network 315, as is well known to those skilled in the electronics arts, which provides the ability to shift the sample timing points in the direction of the center of the stairstep periods of the received video signal. As a premise for the proper operation of the instant invention, it is assumed that the pixel frequency of the source video signal is approximately known (i.e., within about 10%). This is normally the case, so initial adjustment of the receiver sampling rate and phase can be accomplished rapidly. As an aid to performing the initial adjustments, it should be understood that a perfectly sampled text image will produce only two signal levels, while an aliased text image will produce intermediate signals. If the sampling frequency is more than the equivalent of 2 pixels/line in error, the sample signal will display a nodal pattern on the receiver monitor screen with the number of nodes equalling the frequency error. However, the number of sampled signal maxima or minima is relatively independent of the error except at an error of 2 or 1 pixels/line, where the number of either maxima or minima will change significantly. Monitoring the overflow signal of the A/D converter with a DC voltmeter will provide an indication of the number of times the input signal exceeds the range of the A/D converter. When the input signal is aliased, there are fewer than the maximum overflow events, so the voltmeter reads relatively lower. As the sampling frequency approaches the source generator rate, signficantly more plentiful overflow events will occur, thus raising the measured voltage. When the frequency is within one pixel/line, the sampling frequency is correct, but the phase of the sampling clock may be in error. Adjusting the PHASE control to maximize the DC voltmeter reading will assure that all text pixels are being sampled at their correct signal value.

The output on vertical sync outputline 309 of sync stripper 305 is used to trigger controller 304 which in turn resets itself after each video field, reloads the preset counter 302 and applies a compensating DC control voltage along line 310 to the receiving and storing pixel clock oscillator 301.

Figure 4:
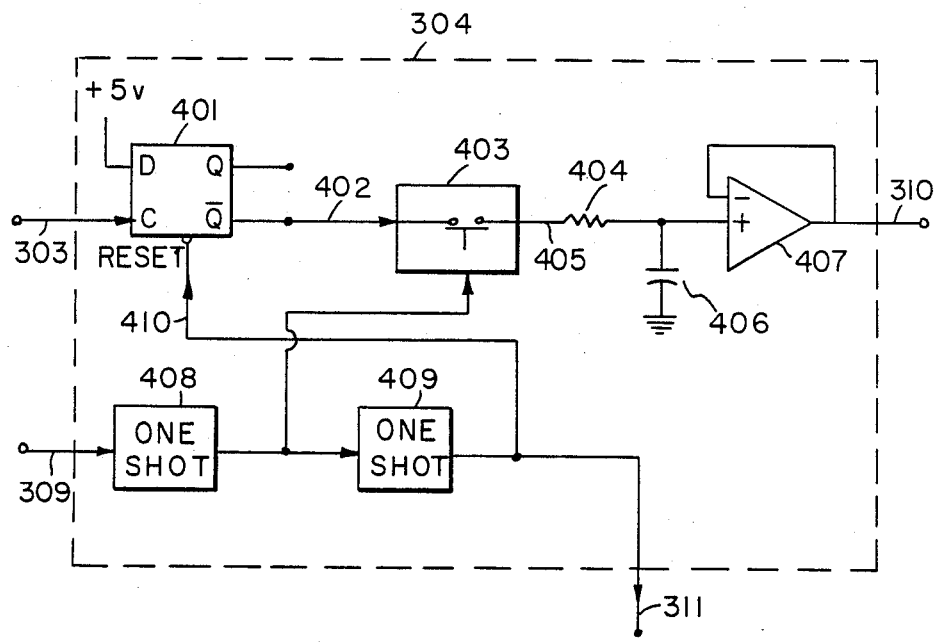
FIG. 4 provides a detailed example of a controller suitable for use with the invention.

A more complete understanding of the mechanism of operation of controller 304 may be discerned by reference to FIG. 4. As shown, D flip-flop 401 is triggered via line 303 by the borrow output of preset counter 302. The output of D flip-flop 401 is transferred from its inverting output terminal along line 402 to electronic switch 403. When switch 403 is closed, its output along line 405 to resistor 404 and capacitor 406 is either 0 volts or +5 volts, depending on the state of D-flip-flop 401 output on line 402. When the counter borrow output remains 0 volts (indicating a low count, i.e., less than 900 per line) the inverted output of flip flop 401 is +5 volts, and the charge on capacitor 406 is raised slightly, causing a corresponding voltage increase across it; when the counter borrow output rises to +5 volts (indicating a high count, i.e., more than 900 per line) the inverted output of flip-flop 401 is 0 volts, and the charge on capacitor 406 is lowered slightly, causing a corresponding voltage drop across it. The voltage across capacitor 406 is in turn transferred via non-inverting buffer amplifier 407 to line 310, thus automatically controlling the frequency of receiving and storing pixel clock oscillator 301. In the preferred embodiment, the sequential voltage outputs of switch 403 indicate the state of the accumulated count of 16 lines of pixel clock pulses within each video field ($16 \times 900 = 14,400$ counts) Switch 403 is enabled only briefly after each video field via one-shot 408 which is triggered via sync stripper output line 309. The second one-shot 409 is used to reset D flip-flop 401 via line 410 as well as to reset preset counter 302 via line 311 after each video field.

The gain of this "bang-bang" feedback system can be adjusted simply by adjusting the length of operation of oneshot 408, thus accomplishing the desired precision for the number of pixel clock periods generated by receiving and storing pixel clock oscillator 301 per received video signal period. Typically, a correction of ±0.1 pixel period/field is effected.

Using the system described above, the receiving pixel clock oscillator can be caused to stay well within the range of 899.9 to 900.1 pixel clock periods per received video image field. This accuracy assures accurate sampling of each and every received stairstep voltage level well into its respective flat region. As a result, the received analog video signal data is accurately and reliably converted by A/D converter 306 into corresponding digital data that is stored in digital memory 307 for any desired future use.

The instant invention has been installed by Applicant into a high resolution medical imaging system with excellent results. The resulting images obtained from the digital memory are entirely without blemishes that would otherwise be present due to aliasing or other inadequate sampling methods.

While the invention has been explained and described with reference to preferred embodiments thereof, numerous possible modifications thereto will be readily apparent to those skilled in the art without departing from the spirit and scope of the invention as recited in the claims that follow.

What is claimed is:

1. In a sampling system for digitally sampling a regular sequence of received analog signals, said signals each having a sampled data portion and a synchronizing portion both comprising time durations that are substantially integer multiples of the period of a transmitting system clock used in generating said signals, apparatus for synchronizing a system clock of said sampling system with said received signals, the invention comprising:

means for detecting said received signals;
controllable variable frequency oscillator means, enabled by said detecting means during said sampled data portions of said received signals, for utilization as the sampling system clock;
analog-to-digital sampling means, responsive to an output of said controllable variable frequency oscillator means, for sequentially sampling said sampled data portions of said received signals;
preset computer means, responsive to an output of said controllable variable frequency oscillator means, for counting the number of points of oscillation of said oscillator occuring between sequential synchronizing portions of said received signals;
control means, responsive to outputs of said preset counter means and said detecting means, for generating a compensating control signal that automatically adjusts the frequency of said variable frequency oscillator so that the number of periods of oscillation of said controllable variable frequency oscillator means occurring during said sampled data portions of said received signals substantially corresponds to a preset count;
means for digitally storing the output of said analog-to-digital samplings means; and,
delaying means, disposed between said detecting means and said oscillator means, for delaying a horizontal synch output of said detecting means.

2. A sampling system according to claim 1, wherein said delaying means is adjustable.

3. A method for synchronously sampling a received analog sampled-data signal having substantially regular data portions and synchronizing portions, which method comprises:

detecting said synchronizing portions;
delaying said synchronizing portions after they have been detected;
counting the number of periods of oscillation of a controllable receiver pixel clock oscillator occuring between successive occurrences of said synchronizing portions;
comparing said number of periods with a predetermined count;
generating a control signal that causes said oscillator to conform said number of periods with said predetermined count;
triggering an analog-to-digital converter with the output of said pixel clock oscillator during said data portions of said received analog sampled-data signal so that said analog-to-digital converter accurately digitally samples the data portions of said received analog sampled-data signals; and,
storing the output of said analog-to digital converter in a digital memory.

4. A method according to claim 3, including the step of adjusting the amount of said delay in order to optimize the quality of the digitally stored signal thus received.

5. A method of sampling and capturing a received video signal including a plurality of scan lines, each containing a fixed number of pixels delimited by synchronizing pulses, comprising sampling and capturing the received video signal using a sampling pulse rate such that the number of the sampling pulses between synchronizing pulses is substantially an integer multiple of the number of pixels in the received video signal, wherein a delay is introduced between at least one of the synchronizing pulses and the sampling pulses and wherein the duration of the sampling pulses is such that the sampling pulses occur completely within a period of time corresponding to a pixle signal output.

6. A method for sampling and capturing a received video signal having a multiplicity of scanning lines delimited by synchronizing pulses each pulse having a leading and a lagging edge, a time interval defined between the lagging edge of a first synchronizing pulse and the leading edge of a second synchronizing pulse, and a video portion having discrete signal levels corresponding to a fixed number of pixels within the time interval, the method comprising:

(1) determining the number of pixels per time interval;
(2) detecting the lagging edge of the first synchronizing pulse and the leading edge of the second synchronizing pulse;
(3) generating a number of pulses equal to the number of pixels within the time interval between the detected lagging and leading edges of the first and second synchronizing pulses respectively; and,
(4) sampling and capturing the received video signal with sampling pulses having a sampling frequency determined by the pulses generated in step (3) above, the sampling pulses number being equal to the pulses generated in step (3), and repeating steps (3) and (4) until all of the received video signal has been captured.

7. A method according the claim 6 wherein the generating step (3) above further includes the steps of:

(3a) generating a number of pulses substantially equal to the determined number of pixels;
(3b) comparing the number of pulses generated with the determined number of pixels to produce an error signal; and,
(3c) using the error signal to control the number of pulses generated by increasing or decreasing their number on the basis of the relative error signal value.

8. A method in accordance with claim 7 wherein a delay is introduced between the lagging edge of the first synchronizing pulse and the leading edge of the first of the sampling pulses.

* * * * *